(12) United States Patent
Zachert

(10) Patent No.: US 11,180,383 B2
(45) Date of Patent: Nov. 23, 2021

(54) DEVICE FOR CLEANING A FLUID CONTAMINATED WITH OIL

(71) Applicant: Wolfgang Zachert, Cologne (DE)

(72) Inventor: Wolfgang Zachert, Cologne (DE)

( * ) Notice: Subject to any disclaimer, the term of this patent is extended or adjusted under 35 U.S.C. 154(b) by 228 days.

(21) Appl. No.: 16/480,412

(22) PCT Filed: Sep. 21, 2017

(86) PCT No.: PCT/EP2017/001126
§ 371 (c)(1),
(2) Date: Jul. 24, 2019

(87) PCT Pub. No.: WO2018/145722
PCT Pub. Date: Aug. 16, 2018

(65) Prior Publication Data
US 2019/0382286 A1    Dec. 19, 2019

(30) Foreign Application Priority Data

Feb. 9, 2017  (DE) .......................... 102017001223.7
Jun. 1, 2017  (DE) .......................... 102017005217.4

(51) Int. Cl.
*C02F 1/28*     (2006.01)
*B01D 17/02*    (2006.01)
(Continued)

(52) U.S. Cl.
CPC .......... *C02F 1/286* (2013.01); *B01D 17/0202* (2013.01); *B01D 17/045* (2013.01);
(Continued)

(58) Field of Classification Search
None
See application file for complete search history.

(56) References Cited

U.S. PATENT DOCUMENTS 2,867,425 A * 1/1959 Teller .................... B01J 19/30
                                                    261/95
4,512,890 A   4/1985 Medbury
                        (Continued)

FOREIGN PATENT DOCUMENTS

DE     2918805 A1    11/1980
DE    19549194 A1     7/1997
FR     2425878 A1    12/1979

OTHER PUBLICATIONS

International Search Report for International Application No. PCT/EP2017/001126 dated Dec. 19, 2017.

*Primary Examiner* — Chester T Barry
(74) *Attorney, Agent, or Firm* — Nexsen Pruet, PLLC; Seth L. Hudson

(57) ABSTRACT

A device (1) for cleaning a liquid (3) contaminated with oil, comprising a filling (7) made of a material that absorbs the oil (2), which filling is located inside a container (4) and is arranged between an inlet and an outlet (5, 6) of the container (4). According to the invention, the absorption property and handling of the filling (7) is increased by virtue of the fact that the filling is formed by a package-type tangle of keratin structures (8) that are randomly arranged and stochastically distributed in all three dimensions, which in the operating state of the device (1), comprise a closed container edge (9) between the inlet and the outlet (5, 6), and rest thereon in a liquid-tight manner.

8 Claims, 3 Drawing Sheets

(51) Int. Cl.

| | |
|---|---|
| *B01D 17/04* | (2006.01) |
| *B01D 39/04* | (2006.01) |
| *B01J 20/24* | (2006.01) |
| *B01J 20/28* | (2006.01) |
| C02F 101/32 | (2006.01) |
| C02F 103/00 | (2006.01) |
| C02F 103/08 | (2006.01) |
| C02F 103/36 | (2006.01) |

(52) U.S. Cl.
CPC ............. *B01D 39/04* (2013.01); *B01J 20/24* (2013.01); *B01J 20/28023* (2013.01); *B01J 2220/4862* (2013.01); *B01J 2220/4875* (2013.01); *C02F 2101/32* (2013.01); *C02F 2103/007* (2013.01); *C02F 2103/08* (2013.01); *C02F 2103/365* (2013.01); *C02F 2201/008* (2013.01); *C02F 2303/16* (2013.01); *C02F 2307/08* (2013.01)

(56) References Cited

U.S. PATENT DOCUMENTS

| | | | |
|---|---|---|---|
| 4,608,173 A * | 8/1986 | Watanabe | B01D 39/1623 210/502.1 |
| 5,453,129 A * | 9/1995 | Allen | E02B 15/041 134/4 |
| 2012/0060303 A1 * | 3/2012 | Blackburn | A61K 8/9789 8/408 |
| 2012/0074067 A1 | 3/2012 | Podella et al. | |
| 2014/0284280 A1 | 9/2014 | Donatelli et al. | |
| 2017/0281783 A1 * | 10/2017 | Burnett | C08J 3/075 |
| 2017/0340531 A1 * | 11/2017 | Manneck | A61K 8/22 |

\* cited by examiner

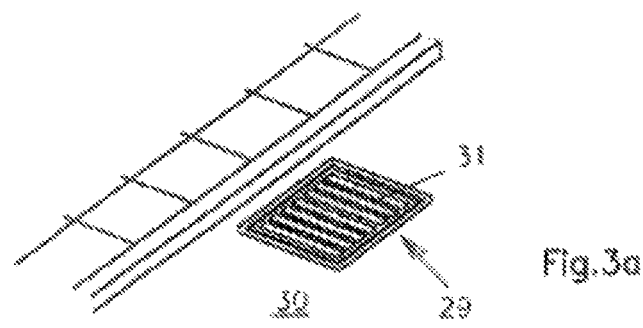
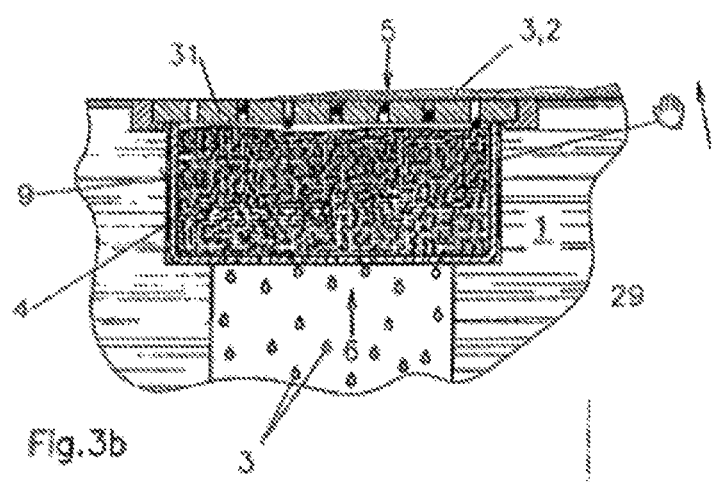
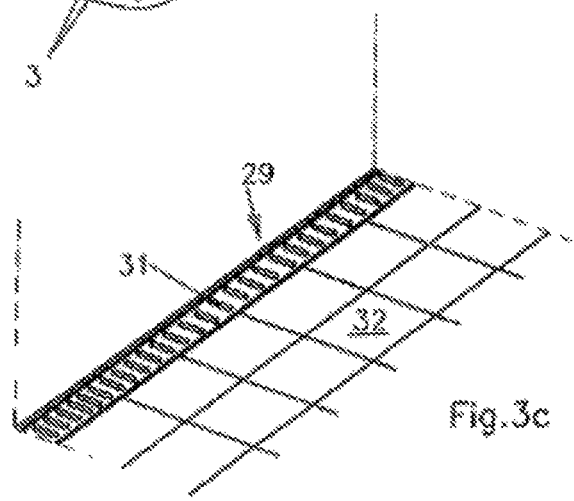

DEVICE FOR CLEANING A FLUID CONTAMINATED WITH OIL

FIELD OF THE INVENTION

The invention relates to a device for cleaning a liquid contaminated with oil according to the generic part of the main claim.

BACKGROUND OF THE INVENTION

Such a device has been known, for example, from DE 86 32 198 U1.

The device disclosed therein includes a container having an inlet and an outlet for the liquid. Between the inlet and outlet, there is a packing of oil-absorbing threads. In the state of use, the liquid flows through the packing.

DE 199 54 643 A1 describes the preparation and application of a floatable oil binder consisting of fibrous proteins and microorganisms.

DE 102 15 411 A1 describes a process and device for the separation and cleaning of condensate. It uses an active charcoal stage for separating oil, wherein a sample of the waste water is taken in the active charcoal stage, and the turbidity of the sample is determined by comparison with a standard.

The object of the present invention is to improve a device of the above mentioned kind in such terms that, on the one hand, the absorption capacity of the packing is increased and, on the other hand, the packing is of a nature that it can be disposed of when saturated, and that it can be replaced by a packing that has not been used intentionally.

The invention achieves this object with the features of the main claim.

BRIEF SUMMARY OF THE INVENTION

According to the invention, the packing is formed by a package-like tangle of keratin structures that have a three-dimensionally irregular orientation and are randomly distributed in all three dimensions, which keratin structures are enclosed by a closed container edge between the inlet and outlet and fit against said container edge in a liquid-tight way in the use state of the device.

Of crucial importance to the invention is the fact that the keratin structures are provided within a container that is circumferentially closed, and the contaminated liquid can flow in over its walls.

The in-flow can be effected through a perforated wall, through an inlet pipe, through gravity penetration of the contaminated liquid, or similar methods.

The out-flow of the cleaned liquid may also be effected through a pipe, through a permeable wall, or by gravity drain.

Since this embodiment of the invention can make use of the fact, in particular, that oil floats on the water surface, it may be quite sufficient to provide the packing according to the invention in liquid-permeable structures, such as fabrics, perforated containers etc., since the oil-contaminated water will be cleaned by mere gravity within the packing that is inside the container to leave the oil behind.

Such constructions can also float on the water surface without difficulty, so that the impregnation of the keratin structures with the oil will take place by itself without further intervention.

Keratin structures, such as those formed, for example, by natural fibrous proteins of animal or human hair, have a high oil binding capacity because of their structures, which can be explained by the fact that such structures have an outer scaly structure on the one hand, and have an inner core with a high number of microscopically small fiber bundles (microfibrils) on the other, whereby numerous microscopically small interstices form within such keratin structures into which the oil can penetrate by capillary forces and is retained therein.

The invention recognized that the capillary effect of such keratin structures is promoted when they are joined together and closely entwined to form an agglomerate within a package-like tangle. Because of the three-dimensionally irregular aggregation and the mutual distribution of the keratin structures that is random in all three dimensions according to the invention, such a tangle or agglomerate is formed. However, at the same time, the cohesion of the keratin structures among themselves is ensured thereby, so that they are virtually in a package, are inserted into the container package by package, and can also be removed easily from the container package by package after their intentional use, followed by inserting, package by package, fresh keratin structures not saturated with oil. It is also possible to replace the containers, followed by processing the replaced containers for reuse.

It can also be considered that the keratin structures employed, especially hair, will absorb to saturation and thus grow in diameter, causing the free cross-sectional areas in the package-like tangle to become smaller, so that the filtration time increases with every passage.

Preferably, the packing is formed by a single package, so that the packing is available as a separate absorption unit that can be employed in a predetermined reception space of the container. With this measure, the device according to the invention can be constructed easily, for example, for some automated exchange of the respective packings with low expenditure, because only one absorption unit respectively has to be considered for exchange with a subsequent absorption unit in this case. This has the advantage that at least a quasi continuous cleaning process is ensured with a liquid that can be continuously supplied to the device and cleaned according to the invention.

As a possible embodiment of a device according to the invention, the invention proposes that a respective first absorption unit present in the reception space is replaced from the reception space of the container by means of an exchange device assigned to said container automatically by a respective second absorption unit as soon as the first absorption unit exhibits a predetermined degree of oil saturation. The degree of saturation of the absorption unit can be determined automatically, for example, by means of an optical recognition device attached to the container or to the outlet. The recognition device may be connected, for example, with a PLC (programmable logic controller), which addresses the exchange device through a respective connection for the automated exchange of the absorption units, and optionally stops the continuous in-flow or out-flow of the liquid by addressing the respective valve in the inlet or outlet in the period of exchanging. Preferably, the respective first absorption unit is automatically supplied to a collection point through a transport device after the exchange has taken place.

Each absorption unit supplied to the collection point is advantageously constituted by essentially oil-filled or oil-soaked keratin structures, which can be processed, for example, into briquettes or pellets after their intentional use, in order to produce or process briquettes or pellets for the purpose of producing power. In the processing, the oil-saturated keratin structures may be squeezed out or spun at first to obtain an excess portion, if any, of the oil remaining in the keratin structures in view of the production process of the briquettes or pellets, which may then be processed together with the keratin structures to form said briquettes or pellets, wherein it is conceivable that binders may be employed in the course of processing.

The changing device may be formed, for example, by a revolver-like system with at least two drums that rotate with their respective longitudinal axes about a common rotational axis. The drums may have a cylindrical tubular shape with an opening end assigned to the inlet, and an opening end assigned to the outlet, whereby, when the respective second absorption unit is driven into the tubular shape, the first absorption unit can be driven out by the second absorption unit through the opening end assigned to the inlet and out of the opening end assigned to the outlet. The driving in and out is supported by the fact that the keratin structures of the packing or of the absorption unit are enclosed by the container edge, which is here provided by the drum wall, and fit to this edge liquid-tightly. The liquid-tight fitting also ensures that absorbed oil does not leak from the container, or cannot leak from the cleaning device laterally between the inlet and outlet. The driving out can be facilitated even more when the container edge, or here the drum wall, is preferably smooth and designed without undercuts.

Such a revolver-like system has the advantage that a first drum between the inlet and outlet can be moved out by a rotation around the rotational axis on a circular path, and at the same time a subsequent drum filled with a virgin absorption unit immediately takes its place on this circular path between the inlet and outlet, so that a continuous in-flow of the liquid and a continuous out-flow of the cleaned liquid is ensured almost without delay. The drum respectively moved out is fed to a charging station essentially comprising a transport belt for the automated feeding of virgin absorption units and a charging piston, in order to refill it with a virgin absorption unit.

The absorption unit is preferably formed by having the keratin structures in a bale form, which has an outer shape with a design complementary to the inner shape of the reception space. Because of the bale form, the absorption unit can be easily driven into the drum by a piston as stated above, like a powder package in a cannon.

For forming the bale shape of the keratin structures, the invention proposes that a net be used having a mesh size that is smaller than a predetermined minimum length for the keratin structures. The net serves to coat the keratin structures in order to tie them up into a bale shape. The limitation of the mesh size ensures that the keratin structures are retained inside the net also at the marginal zone of the bale shape.

In order to further promote the absorption capacity of the package according to the invention, the invention proposes that the tangle of the keratin structures be essentially uniformly compacted along the path of the liquid between the inlet and outlet, wherein the compaction is such that the keratin structures absorb at least 6.5 times their own weight of oil from the liquid before saturation of the keratin structures with oil occurs. Preferably, natural fibrous proteins, for example, wool from Mediterranean sheep breeds, are provided for the keratin structures. The invention found that it is possible with such a material to absorb even 12 times the own weight of the keratin structures of oil from the liquid before saturation of the keratin structures with oil occurs, for a corresponding compaction of the keratin structures.

Further, the invention found that the absorption capacity of the packing can be influenced positively if several different keratin-containing materials are mixed together to form the packing. For example, feathers or downs from different species of birds and/or animal hair from different species of beasts may form the basic materials for the packing, from which a packing of keratin structures can be respectively assembled. Thus, for example, processed goose feathers admixed with sheep wool may optionally form the packing. The feathers may be processed to be freed from the feather shaft for the purpose of forming the packing.

In addition, it is conceivable that at least one basic material for the packing is constituted of keratin-containing natural materials, such as leather and/or hide with keratin-containing horny layer components. Further, it is conceivable that such keratin-containing natural materials, such as leather, hide with horny layer components, but also pelts, furs or even finger and toe nails, claws, hooves, horns, spikes, whalebones, bills, horny scales etc., can be used to obtain therefrom, for example, proteinogenic amino acids by a chemical treatment for the formation of a basic material for the packing according to the invention. For this purpose, it may be quite advantageous to hydrolyze these keratin-containing natural materials at first with an acid, such as hydrochloric acid, because of their insolubility in water, and to neutralize the hydrolysate, for example, with ammonia to obtain amino acids for the formation of a basic material for the packing.

Without meaning to leave the technical field of the device according to the invention, it may be mentioned here that one or more of the basic materials described above, combined to a packing according to the invention, may altogether be suitable for using a thus formed packing according to the invention, for example, as a filter and/or insulation material as well, for example, as a fine-dust filter for cars, especially cars with a diesel engine, chimneys, fireplaces, or as a sound or heat insulation.

Depending on how the material composition of different keratin structures turns out, when the keratin structures are compacted accordingly, even at least 16 times to at least 28 times of the own weight of the keratin structure of oil can be adsorbed from the liquid before saturation of the keratin structures with oil occurs. From experiments, it could be seen that the above range of values for the absorption capacity can be achieved, especially when goose feathers are used.

This information is valid on condition that the keratin structures are present in their natural lengths and diameters.

However, it may also make sense to cut/chop the keratin structures to a more or less uniform length, so that the packing density of the comminuted keratin structures becomes considerably higher. From this, it may be readily concluded that the absorption capacity of such comminuted keratin structures may altogether be above 28 times their own weight before they are saturated with oil.

If desired, the optimum length of these keratin structures may also be found out by experiments, by determining the absorption capacity of respective packages of keratin structures as a function of the respective length of the keratin structures, optionally also determining the maximum mathematically by differentiation.

The device according to the invention may be employed in a stationary or mobile mode.

In a stationary mode, the device may be operated, for example, for separating oil in workshops, for example, in order to separate water and/or antifreeze agents, such as glycol, from oil contaminants. It is also conceivable here that the device is used, for example, for cleaning oil-contaminated glycerol.

An embodiment of the invention may involve the incorporation of the device in channel systems of filling stations, workshops and/or roads or the like. For example, a basket assigned to a manhole cover could be converted to a device according to the invention. Such a basket could be designed as a container of the device by having an opening at the upper side for in-flow, which may be formed by the upper side of a closed basket edge or container edge to which the keratin structures are fitted liquid-tightly, and a bottom designed as a sieve for drainage, to which the lower side of the basket edge or container edge is connected.

In a mobile mode, the device may be employed, for example, on a sea-going vessel. The device may be installed in the vessel, in order to suck up oil-contaminated seawater in situ, especially in oil catastrophes, in a continuous process, to clean it in one or more stages according to the invention, and to recycle the cleaned water into the sea. A "multistage cleaning" in this invention means several passages of the supplied liquid through one and the same device, or one passage of the liquid through several devices according to the invention connected in series like a cascade.

Further, it is also possible that the device has a mobile design in such terms that it can be led by a vessel through an oil field floating on the sea with its respective inlet in front. In this case, the container of the device may be formed by a net as mentioned above in a particularly simple way, which has a front side assigned to the inlet and a back side assigned to the outlet, wherein the packing may be sandwiched between the sides, and wherein the front and back sides are connected at their respective marginal regions through a closed net edge, which represents the container edge here, in order to avoid leakage of the packing especially in the crosswise direction of the sides. Since the packing is in the form of an agglomerate according to the invention, it is possible that the front side has an opening for charging the net with the packing, which opening may remain open in intentional use, because the cohesion of the keratin structures in ensured because of their three-dimensionally irregular distribution. Further, the cohesion according to the invention of the keratin structures in the agglomerate ensures that they can be removed from the net package by package and immediately ready for disposal after their intentional use.

The net edge or container edge may have a narrow band design and nevertheless be used for attaching dragging ropes. In particular, the closed net edge or container edge is suitable for attaching floats, or may also be optionally designed as a float itself.

DESCRIPTION OF THE DRAWINGS

The present invention is illustrated and described herein with reference to the various drawings, in which like reference numbers denote like method steps and/or system components, respectively, and in which:

FIG. 3a shows an application example of the invention;

FIG. 3b shows the application example according to FIG. 3a in a sectional representation;

FIG. 3c shows another application example of the invention.

In the following, unless stated otherwise, the following description always applies to all Figures.

DESCRIPTION OF THE INVENTION

Figure 1:
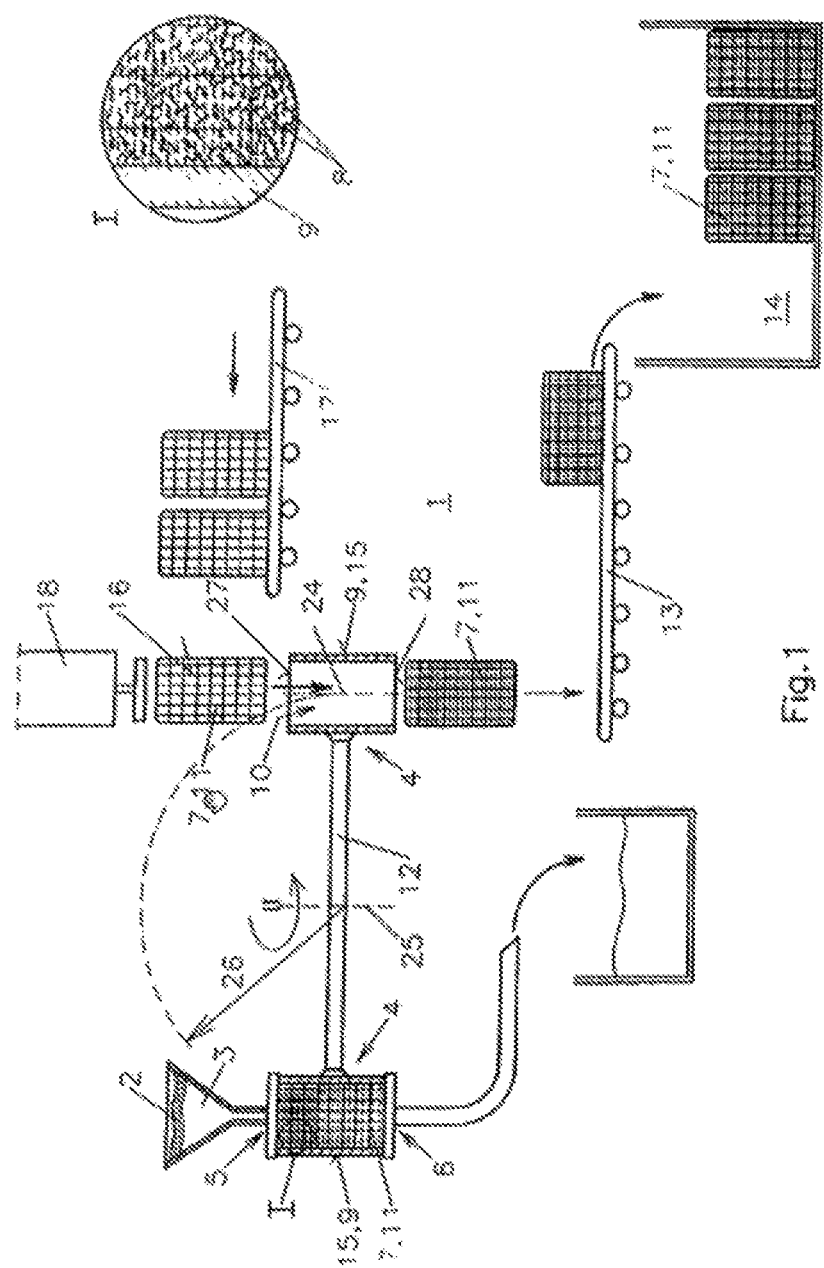
FIG. 1 shows a functional representation of the device according to the invention.
Figure 2:
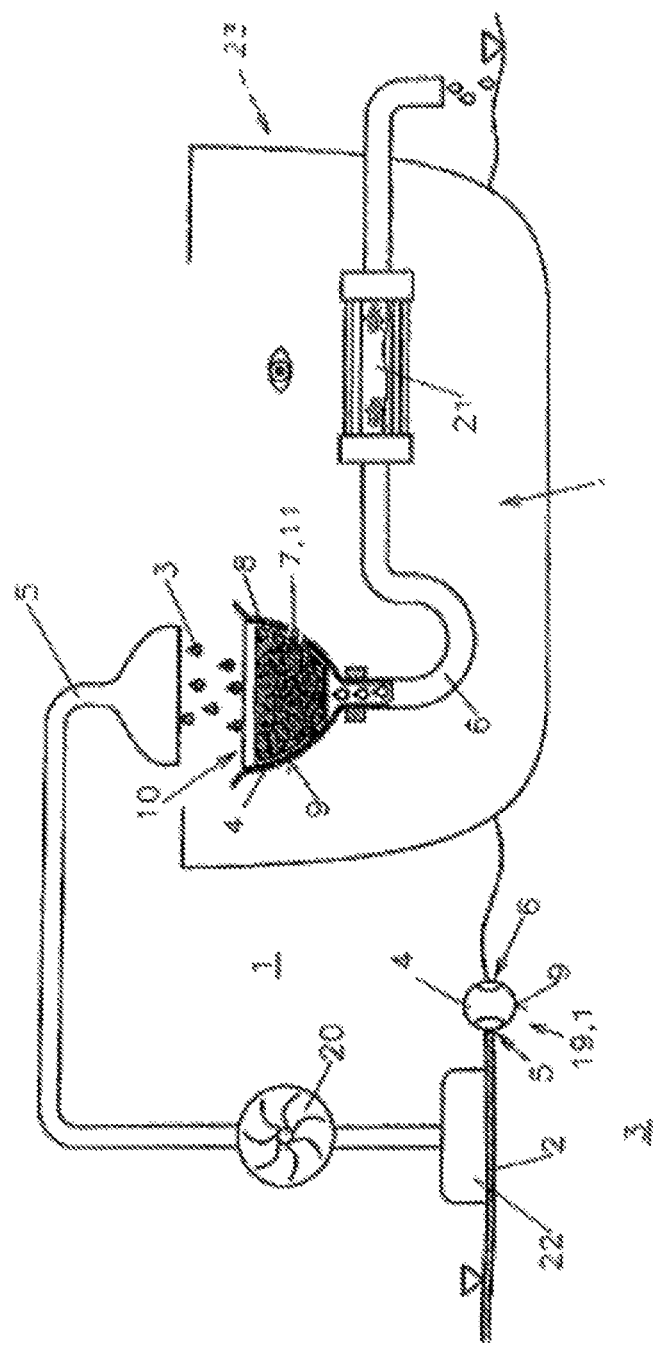
FIG. 2 shows the device according to the invention in an exemplary case of mobile use.

FIGS. 1, 2 and 3b respectively show Examples of a device (1) according to the invention for cleaning a liquid (3) contaminated with oil (2).

FIG. 1 shows a device (1) according to the invention in a schematic representation, in which the cleaning process according to the invention is shown in an exemplary automated implementation variant.

In particular, FIG. 2 shows a concrete case of application of the invention, the device (1) here being shown in a case of mobile use. Here, the device (1) is installed in a sea-going vessel (23), which sucks up oil (2) floating on seawater, which is enclosed by a barrier (19) here, together with the seawater, and is recycled into the sea as waste water cleaned from oil (2) by means of the device (1). For a simplified representation, the device (1) is represented here merely in its basic principle as non-automated, wherein preferably an automated device (1) designed according to FIG. 1 is employed inside the vessel (23), in which it is also possible to clean the liquid (3) supplied to the device (1) in several stages before it is recycled into the seawater.

The FIGS. 1 and 2 and 3b show that the device (1) according to the invention comprises a container (4), which has an inlet and outlet (5, 6) for the respective liquid (3). Between the inlet and outlet (5, 6), a packing (7) of a material absorbing the oil (2) is provided in the container (4), through which material a liquid (3) contaminated with oil (2) can flow in the intentional use state of the device (1).

According to the invention, the absorption property and handling of the packing (7) with respect to its placement within the container (4) is increased because the packing (7) is formed by a package-like tangle of keratin structures (8) that have a three-dimensionally irregular orientation and are randomly distributed in all three dimensions. The irregular distribution of the keratin structures (8) is represented, in particular, in the detail view I in FIG. 1 and in FIG. 3b.

Further, FIG. 1 and FIG. 3b, in particular, show that the keratin structures (8) are enclosed by a closed container edge (9) between the inlet and outlet (5, 6) and fit against said container edge in a liquid-tight way in the use state of the device (1).

The packing (7) is formed by a separate absorption unit (11) that can be employed in a predetermined reception space (10) of the container (4).

In the Example shown in FIG. 2, the absorption unit (11) can be inserted from above into a funnel-shaped container (4), and for this purpose, it has an outer shape with a design complementary to the inside shape of the container (4).

In contrast, the device (1) installed inside a vessel (23) can also be operated automatically. Thus, FIG. 1 shows that a respective first absorption unit (11) present in the reception space (10) is replaced from the reception space (10) of the container (4) by means of an exchange device (12) assigned to said container (4) automatically by a respectively succeeding second absorption unit (11).

The changing device (12) is formed here by a revolver-like system with at least two drums (15), into each of which an absorption unit (11) can be inserted. The drums (15) function as containers (4) and have a straight cylindrical tubular shape. The drums (15) each have a longitudinal axis (24), by which they rotate on a common circular path (26) about a common rotational axis (25), wherein the respective drum (15) on the left side is operated for cleaning the liquid (3) in an intentional use state. For this purpose, the left drum (15) with its absorption unit (11) is engaged between the inlet and outlet (5, 6).

The right drum (15) is provided below a piston cylinder (18) and has an opening (27) assigned to the inlet (5). The piston cylinder (18) serves to free the respective right drum (15) from an oil-saturated absorption unit (11) and to replace it with a virgin absorption unit (11). For this purpose, virgin absorption units are automatically fed to the piston cylinder (18) by means of a transport device (17). The piston cylinder (18) serves as a charging station and drives a virgin absorption unit (11) into the reception space (10) of the right drum (15) by means of its extended piston, while the virgin absorption unit (11), while it is driven in, drives out the oil-saturated absorption unit (11) represented below the right drum (15) through a drum opening (28) assigned to the outlet (6), and feeds it to a transport device (13) by which the respective used absorption units (11) saturated with oil (2) can be supplied to a collection point (14).

For an easy process of driving the respective absorption units (11) in and out, the latter are formed while the keratin structures (8) are in the form of bales having an outer shape designed to be complementary to the inner shape of the reception space (10), which is tubular here. In order to form the bale form of the keratin structures (8), a net (16) is used by which the keratin structures (8) are wrapped and compacted together. The net (16) has a mesh size that is smaller than a predetermined minimum length for the keratin structures (8).

As soon as the absorption unit (11) of the left drum is saturated with oil, it is automatically moved on the circular path (26) towards the piston cylinder (18), while a drum (15) succeeding it on the circular path (26) immediately takes its place. Preferably, more than two drums (15) are provided on the circular path (26), especially in order to increase the safety of the device (1) in view of a continuous operation. It is conceivable that such drums (15) are lined up and moved on closed curve paths of a predetermined path length, wherein one or even more drums (15) are charged with absorption units (11) simultaneously within one charging station, while one or even more drums (15) are in intentional operation within one charging station.

Such complex systems can be readily installed on large sea-going vessels, such as cargo ships, for mobile use on bodies of water, to be employed, for example, in oil catastrophes. As mentioned above, FIG. 2, in particular, shows a case in which oil (2), which floats on the liquid (3), which is sea water here, after an oil catastrophe and is enclosed by a barrier (19), together with the liquid (3) through a suction cup (22) and a pump (20), and supplied to the inlet (5). The liquid (3) cleaned according to the invention is drained through the outlet (6). The outlet (6) comprises a sight glass (21), through which the state of the liquid (3) can be supervised optically.

An alternative or supplement to a complex device (1) incorporated within a vessel (23) is conceivable in which the device (1) is also a part of a barrier (19) floatable on the sea water, comprising at least a reception space for receiving the packing (7) of keratin structures (8) according to the invention, an inlet (5) respectively facing towards the oil (2) floating on the sea water, an outlet (6) respectively facing away from the oil (2) floating on the sea water, and a circumferential barrier edge provided between the inlet and outlet, which is the container edge (9) of the thus formed device (19) in this case and ensures that the liquid-tight fit of the keratin structures according to the invention prevents oil (2) present within the device (1) between the inlet and outlet (5, 6) from leaking outside. In order to form the barrier (19), a net (16) as described above can be used to form the container (3) of the barrier (19), in particular, and thus the reception space for the packing (7).

Along the path of the liquid (3) between the respective inlet and outlet (5, 6), the tangle of the keratin structures (8) is essentially uniformly compacted, wherein the compaction is so high that the keratin structures absorb at least 6.5 times their own weight of oil (2) from the liquid (3) before saturation of the keratin structures with oil occurs. Preferably, natural fibrous proteins from wool, hair or feathers are formed for the keratin structures (8). For example, sheep wool from sheep breeds from Mediterranean countries and/or goose feathers may be employed. Thus, it can be achieved that the compaction of the keratin structures is so high that they absorb at least 12 times to even 28 times their own weight of oil (2) from the liquid (3) before saturation of the keratin structures (8) with oil (2) occurs.

Especially FIGS. 3a, b and c show that the device (1) according to the invention can be incorporated within canal or effluent systems (29). Thus, FIG. 3a in connection with FIG. 3b shows that the device (1) may be part of a manhole provided in a road (30). FIG. 3b shows that the manhole has a basket embodied as a container (4) according to the invention. The basket or the container (4) has a container edge (9) against which the keratin structures (8) are fitting liquid-tightly. The container is open at the top and covered by a cover (31), which has openings for the inlet (5) of liquids (3). When the cover (31) has been opened, the container (4) can be easily freed from the keratin structures after the saturation thereof because of their cohesion according to the invention, and fresh unsaturated keratin structures can be refilled. The bottom of the container has a sieve-like design to form an outlet (6) for the liquid (3). FIG. 3c shows the floor (32) of a workshop in which a collection groove with a sieve-like bottom is inserted that is designed as a device (1) according to the invention and covered by a sieve-like or grid-like cover (31).

At any rate, the invention offers an almost unlimited potential of possible applications. In particular, when the packing according to the invention is provided in liquid-permeable bags, sacks or other fabrics, it is altogether possible to take up oil present on the ground, for example, on roads, in pipeline areas, in refinery areas, and dispose of it in a most ecological way.

Experiments so far have shown that the collection devices according to the invention, including floating ones, can be used to free harbor areas from floating oil films very effectively, or that the uptake of oil-containing materials in the vehicle field works excellently.

Also, marine birds with oil-soaked feathers can be saved, because the affinity of the oil in the feathers for the packing material according to the invention is higher than the affinity for the feathers, which is also soaked with water.

LIST OF REFERENCE SYMBOLS 1 device
2 oil
3 liquid
4 container
5 inlet
6 outlet
7 packing
8 keratin structures
9 container edge
10 reception space 11 absorption unit
12 exchange device
13 transport device
14 collection point
15 drum
16 net
17 transport device
18 piston cylinder
19 barrier
20 pump
21 sight glass
22 suction cup
23 vessel
24 longitudinal axis
25 rotational axis
26 circular path
27 opening (5)
28 opening (6)
29 canal system
30 road
31 cover
32 floor

The invention claimed is:

1. A device for cleaning a liquid contaminated with oil, comprising a container having an inlet for a contaminated liquid and an outlet for a cleaned liquid and at least one valve disposed in the inlet or outlet, wherein the container contains a packing of a material that can absorb the oil, through which material the contaminated liquid can flow to leave the contaminants behind, the packing comprises a package-like tangle of keratin structures that are randomly distributed in all three dimensions, the keratin structures are enclosed by a closed container edge between the inlet and the outlet and fit against it in a liquid-tight way the package-like tangle of keratin structures is essentially uniformly compacted along the path of the liquid between the inlet and outlet, wherein the compaction is such that the keratin structures absorb at least 6.5 times their own weight of oil from the fluid before saturation of the keratin structures with oil occurs, the packing is formed by the first absorption unit within a reception space of the container, wherein the first absorption unit present in the reception space can be replaced automatically with a second absorption unit in the reception space of the container by an exchange device assigned to the container, wherein the replacement takes place when the first absorption unit exhibits a predetermined degree of oil saturation, wherein the degree of saturation of the absorption unit is determined automatically by an optical recognition device attached to the container or to the outlet, wherein the recognition device is connected to a programmable logic controller, which addresses the exchange device through a respective connection for the automated exchange of absorption units and optionally stops the continuous in-flow or out-flow of liquid by addressing the respective valve in the inlet or outlet, wherein the respective first absorption unit is automatically supplied to a collection point through a transport device after the exchange has taken place.

2. The device according to claim 1, wherein said exchange device comprises a revolver-like system with at least two drums.

3. The device according to claim 1, wherein said first absorption unit shapes the keratin structures in a bale form, which has an outer shape with a design complementary to the inner shape of the reception space.

4. The device according to claim 3, wherein the first absorption unit comprises a net having a mesh size that is smaller than a predetermined minimum length for the keratin structures, wherein the net is used to shape the keratin structures into the bale form.

5. The device according to claim 1, wherein the compaction of the keratin structures is such that they absorb at least 12 times their own weight of oil from the liquid before saturation of the keratin structures with oil occurs.

6. The device according to claim 1, wherein the keratin structures are formed from natural fibrous proteins.

7. The device according to claim 1, wherein said device is mobile.

8. The device according to claim 1, wherein the device is incorporated in a stationary flow process for cleaning sea water and fresh water.

* * * * *